Dec. 22, 1959  M. C. TROYER  2,917,859
ANIMATED FISH LURE
Filed Nov. 2, 1956
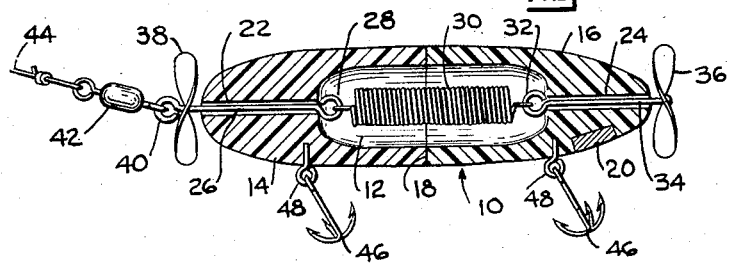
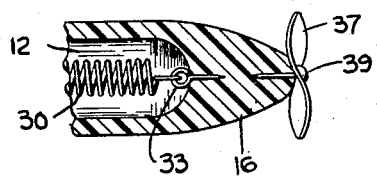
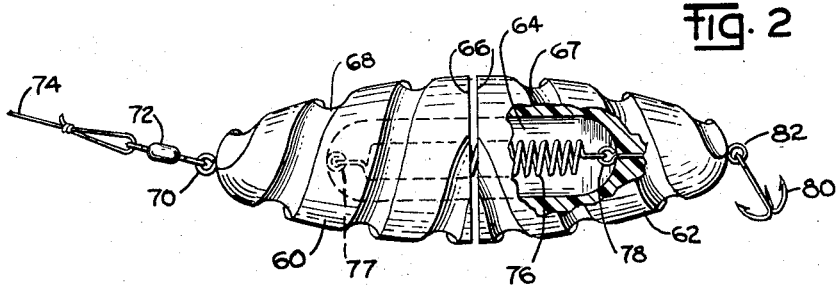
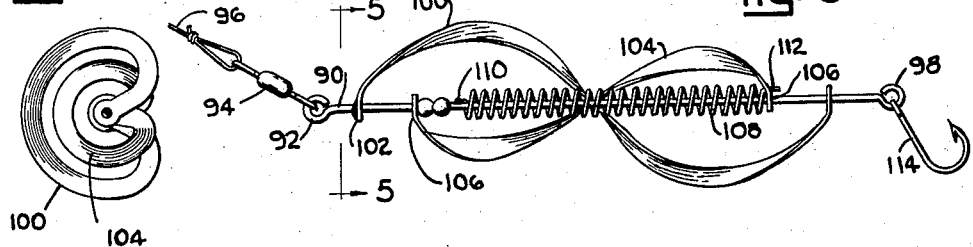
INVENTOR.
MILO C. TROYER.
BY
Eugene C. Knoblock
ATTORNEY United States Patent Office 2,917,859
Patented Dec. 22, 1959

2,917,859

ANIMATED FISH LURE

Milo C. Troyer, Albion, Ind.

Application November 2, 1956, Serial No. 620,103

10 Claims. (Cl. 43—26.2)

This invention relates to artificial fishing lures, and more particularly to an animated fishing lure.

The primary object of this invention is to provide a device which is so constructed and arranged that a moving part thereof reacts with the water as the lure is drawn through the water and actuates means for storing energy which in turn is released when the pull upon the lure is ended, so as to cause a further animation or movement of the lure to occur incident to the release of the stored energy.

A further object is to provide a device of this character having a rotatable member responding to movement of the lure through the water to act upon a resilient member to wind the same in energy storing relation for release at a predetermined rate when released of energy-creating tension upon the lure occurs so that a different type of animation occurs incident to the release of the stored energy.

A further object is to provide a lure of this character having a rotatable water reactance member connected to and adapted to wind a resilient member incident to its rotation relative to a restraining member having an opposed water reactance incident to pull of the lure, said parts being so arranged that unwinding of said energy-storing member upon cessation of pull on the lure will cause a rotation of a water reactance member in a direction to propel the lure opposite to the direction producing the rotation of the first named water reactance member.

Other objects will be apparent from the following specification.

In the drawing:

Fig. 1 is a longitudinal sectional view of a lure illustrating one embodiment of the invention;

Fig. 2 is a side view of a lure illustrating another embodiment of the invention;

Fig. 3 is a side view of a third embodiment of the invention;

Fig. 4 is a fragmentary sectional view of another embodiment of the invention; and Fig. 5 is an end view of the lure shown in Fig. 3.

Referring to the drawing, and particularly to Fig. 1 which illustrates one embodiment of the invention, the numeral 10 designates a body of a fish lure of any desired configuration and preferably of the plug type, having a chamber or cavity 12 formed therein. As here shown, the body is formed of a pair of parts 14 and 16 having a parting plane 18 interrupting the chamber 12, with the parting surfaces of the two parts 14 and 16 being interrupted by recesses cooperating to define the chamber 12. If desired, one or more weight elements 20 may be carried by the body to control the position which the lure assumes in the water, or any other means for controlling the position or longitudinal inclination of the lure in the water may be employed. A longitudinal bore 22 is formed in the body part 14 communicating with the chamber 12, and the longitudinal bore 24 may be formed in the rear part 16.

A wire or other shaft member 26 extends through the passage 22 and is rotatable therein. At its inner end the wire 26 preferably terminates in an eyelet 28 to which is connected one end of an elongated resilient member 30. The member 30 is here shown as a coil spring, but the same may take other forms, for example, an elastic strand or group of strands formed of rubber or other resilient material capable of storing energy therein when twisted. The opposite end of the spring 30 is connected to a head or eyelet 32 upon a shaft 34 extending through the bore 24.

A water reactance member, such as a propeller 36, is fixed upon the shaft 34, and a second water reactance member 38 is fixed upon the shaft 26. Said members 36 and 38 are oriented or pitched oppositely to one another so that their respective reactions with the water incident to movement of the lure through the water will be opposite one another, so as to cause relative rotation of the opposite ends of the resilient member 30 to wind or twist the same for the purpose of storing energy.

The shaft 26 will preferably terminate in an outer eyelet 40 to which is preferably connected a swivel member 42 to which in turn is connected a line 44 in the well known manner. One or more fish hooks 46 will be carried by the lure, as by means of eyelets 48 carried by the lure body parts.

A slightly different construction or arrangement is illustrated in Fig. 4, wherein the rear body part 16 has an attachment member 33, such as a screw eye, anchored thereto at the rear or inner end of the cavity 12 therein for connection or anchorage with the rear end of the resilient member 30. A water reactance member 37 at the rear end of the lure is secured by fixed attachment means 39 to the body 16. In this arrangement the front construction, including the rotatable shaft 26 connected to the front end of the resilient member 30 and carrying a water reactance member 38 of a pitch opposite the pitch of the member 37 will be provided.

In both of these constructions trolling or pulling upon the lure by the line 44 will cause rotation of the member 38 in a sense and direction to wind the member 30 for the purpose of storing energy as long as the pull is continued or until such time as the member 30 is wound to its maximum energy-storing capacity. When the pull upon the line 40 is released to terminate the normal water reactance and force-generating operation of the member 38, the energy-storing member 30 commences to operate in a direction to release the energy stored therein. This will result in rotation of one or the other, or possibly both of the water reactance members 36, 38 in Fig. 1, to produce agitation of the water around the lure as the lure remains stationary, or to produce continued movement of the lure of the same or a different character than the initial pull. Thus, in the construction shown in Fig. 4, where the water reactance member 37 is fixed relative to the body 16 so that only the opposite water reactance member is free to rotate incident to release of the energy in the spring 30, the opposite member, such as the front water reactance member or propeller 38, will rotate in a direction opposite that in which it rotated when it was drawn through the water by the pull of the line 44. Consequently, this reverse rotation of the water reactance member 38 tends to drive the body in a direction reverse of the direction of line pull. In cases where the Fig. 1 construction is involved, in which both of the water reactance members 38 and 36 are free to revolve when pull upon the line is ended, there may still remain a sufficient restraint upon rotation imposed by the line 44 to cause rotation of the member 36 relative to the member 38 in such a manner as to cause the lure to be propelled in a forward direction incident to the restoration of the member 30 to its rest of unstressed position.

In the construction of the lure shown in Fig. 2, the same consists of a front body part 60 and a rear body part 62, each having a cavity or recess 64 therein confronting and substantially registering with the cavity or recess of the other at the parting face 66. The two bodies are provided with helical grooves 67 and 68 which are oppositely pitched as shown. A line-attaching eye 70 is connected to the end of the body part 60 and has connected therewith a swivel 72 for connection with a line 74.

A coil spring, rubber band or strip 76 or any other resilient twistable material is fixedly connected at one end thereof to the body 60 as by means of an eyelet 77 carried by said body portion within the cavity 64 and a similar attachment member 78 is carried by the rear body part 62 for anchorage of the opposite end of a member 76. One or more hooks 80 are secured to the lure, and in the preferred arrangement only a single hook is provided attached to an eyelet or other securing means 82 located at the center line of the rear portion 62 of the body. The water reactance properties, i.e., pitch, width, depth, etc., of the helical grooves 67, 68 may be different or may be similar.

In this construction, as in the above described construction, the properties of water reactance members 67 and 68 will be such that opposite actions are produced upon a pull on the line 74 so as to wind and store energy in the spring or other member 76, subject to being released when pull upon the line 74 ends. Note in this construction that the two body parts 60 and 62 will rotate relative to each other incident to the winding of the spring 76 and the release of tension therefrom. This is to be distinguished from the Fig. 1 construction in which the body 10 may remain stationary or in which the body parts 14 and 16, if they revolve, revolve together or may revolve independently of each other.

Another embodiment of the invention is illustrated in Fig. 3, wherein a shaft or wire 90 has an eyelet 92 at one end to which is connected a swivel member 94 for attachment of a line 96. A helical member, such as a substantially rigid twisted metal or plastic strip, 100 will preferably have one end 102 or, if desired, both ends thereof fixed to the member 90. The helical member 100 will have a pitch and lead in one direction so that a pull upon the line 96 will tend to cause it to revolve. A second substantially rigid helical metal or plastic strip member 104 has its ends 106 journaled upon the member 90 between the ends of the member 100. The member 104 will preferably be shorter than the member 100 and will have a maximum outer diameter less than the minimum diameter of the helical member 100. A resilient member, such as a coil spring 108, is anchored to the member 90 at 110 at one end thereof, and at its opposite end is anchored at 112 to the inner helical member 104. The helical pitch or lead of the two members 100 and 104 is opposite. The extent of the twist of the members 100 and 104 may vary. Thus, though Fig. 3 shows a substantially 360 degree twist of the members 100 and 104, the parts may be so arranged that the twist of each is greater or less than 360°.

The operation of the device shown in Fig. 3 is substantially the same as that in the other embodiments. Specifically, a pull upon the line 96 causes a water reactance of the two members 100 and 104 opposite in character and of such a nature as to twist or wind the member 108 in a manner to store energy therein. A release of the pull upon the line 96 tends to permit release of the energy stored in the member 108 with resultant motion of one or both of the members 100 and 104 to cause agitation of the water alone or conjointly with movement of the lure until such time as the stored energy in the member 108 has been fully released. A fish hook 114 may be carried by the member 90 at the rear thereof.

While the preferred embodiments of the invention have been illustrated and described, it will be understood that changes in the construction may be made within the scope of the appended claims without departing from the spirit of the invention.

I claim:

1. A fish lure comprising a line-attaching means, a pair of spaced fore and aft water reactance members rotatable about their longitudinal axes, and resilient means interconnecting said reactance members, said line-attaching means including a swivel accommodating rotation of said reactance members independently of said line, said reactance members having opposite reaction with the water to stress said resilient means when said lure is drawn through the water.

2. A fish lure comprising a coil spring, an elongated pair of water reactance members of opposite pitch, said members being spaced and connected with opposite ends of said spring whereby they wind said spring when drawn through the water, and line attachment means associated with one reactance member and including a swivel.

3. A fish lure comprising a draft member including a swivel, a leading rotatable water reactance member connected to said draft member, an elongated coil spring connected at one end extending rearwardly from said water reactance member to rotate therewith, and a second trailing rotatable water reactance member spaced rearwardly from said leading member and connected to the opposite end of said coil spring and responsive to line pull to tend to rotate said spring in a direction opposite the direction of rotation of said first reactance member.

4. A fish lure as defined in claim 1, wherein said reactance members include elongated stems, and a body having a chamber receiving said resilient means and passages rotatably receiving said stems.

5. A fish lure as defined in claim 1, wherein said reactance members constitute propellers of opposite pitch, and wherein a lure body is interposed between said propellers and has a cavity substantially enclosing said resilient member, at least one propeller being rotatable independently of said body.

6. A fish lure as defined in claim 1, wherein said reactance members have opposed helical water reactance surfaces.

7. A fish lure as defined in claim 1, wherein said water reactance members constitute substantially aligned body parts having recessed confronting ends receiving said resilient means, said body parts having opposed helical grooves.

8. A fish lure as defined in claim 1, wherein said water reactance members constitute a pair of substantially concentric interfitting helical strips adapted to rotate independently and in opposite directions.

9. A fish lure as defined in claim 1, wherein said water reactance members constitute elongated interfitting helical strips, and an elongated stem concentric of said reactance members and fixed to one reactance member, the other reactance member being journaled on said stem.

10. A fish lure comprising a line-attaching means, a pair of spaced fore and aft opposed rotatable water reactance members of opposite pitch, said line-attaching means including a swivel, and means actuated responsive to rotation of one of said members when drawn through the water to store energy, said last named means releasing said stored energy upon release of tension on said line-attaching means.

References Cited in the file of this patent

UNITED STATES PATENTS

| | | |
|---|---|---|
| 771,116 | Barnhart | Sept. 27, 1904 |
| 1,923,623 | Hoage | Aug. 22, 1933 |
| 2,097,986 | McEwen | Nov. 2, 1937 |
| 2,420,451 | Spenard | May 13, 1947 |
| 2,468,877 | Horton | May 3, 1949 |